MAGNETIC REACTION TESTING APPARATUS AND METHOD OF TESTING UTILIZING SEMICONDUCTOR MEANS FOR MAGNETIC FIELD SENSING OF AN EDDY-CURRENT-REACTION MAGNETIC FIELD

Filed Aug. 13, 1964 8 Sheets-Sheet 1

INVENTORS.
ROBERT C. McMASTER
EDWIN D. SISSON
BY
MAHONEY, MILLER & RAMBO
BY Wm. V. Miller
ATTORNEYS INVENTORS
ROBERT C. McMASTER
EDWIN D. SISSON
BY
MAHONEY, MILLER & RAMBO
BY Wm. V. Miller
ATTORNEYS MAGNETIC REACTION TESTING APPARATUS AND METHOD OF TESTING UTILIZING SEMICONDUCTOR MEANS FOR MAGNETIC FIELD SENSING OF AN EDDY-CURRENT-REACTION MAGNETIC FIELD Filed Aug. 13, 1964 8 Sheets-Sheet 3

INVENTORS.
ROBERT C. McMASTER
EDWIN D. SISSON
BY
MAHONEY, MILLER & RAMBO
BY Wm. V. Miller
ATTORNEYS Dec. 19, 1967 R. C. McMASTER ET AL 3,359,495

MAGNETIC REACTION TESTING APPARATUS AND METHOD OF TESTING UTILIZING SEMICONDUCTOR MEANS FOR MAGNETIC FIELD SENSING OF AN EDDY-CURRENT-REACTION MAGNETIC FIELD

Filed Aug. 13, 1964 8 Sheets-Sheet 4

INVENTORS
ROBERT C. McMASTER
EDWIN D. SISSON
BY
MAHONEY, MILLER & RAMBO
BY Wm. V. Miller
ATTORNEYS Dec. 19, 1967 R. C. McMASTER ET AL 3,359,495

MAGNETIC REACTION TESTING APPARATUS AND METHOD OF TESTING UTILIZING SEMICONDUCTOR MEANS FOR MAGNETIC FIELD SENSING OF AN EDDY-CURRENT-REACTION MAGNETIC FIELD

Filed Aug. 13, 1964 8 Sheets-Sheet 5

INVENTORS
ROBERT C. McMASTER
EDWIN D. SISSON
BY
MAHONEY, MILLER & RAMBO
BY Wm. V. Miller
ATTORNEYS MAGNETIC REACTION TESTING APPARATUS AND METHOD OF TESTING UTILIZING SEMICONDUCTOR MEANS FOR MAGNETIC FIELD SENSING OF AN EDDY-CURRENT-REACTION MAGNETIC FIELD Filed Aug. 13, 1964

INVENTORS.
ROBERT C. McMASTER
EDWIN D. SISSON
BY
MAHONEY, MILLER & RAMBO
BY Wm. V. Miller
ATTORNEYS Dec. 19, 1967 R. C. McMASTER ET AL 3,359,495

MAGNETIC REACTION TESTING APPARATUS AND METHOD OF TESTING UTILIZING SEMICONDUCTOR MEANS FOR MAGNETIC FIELD SENSING OF AN EDDY-CURRENT-REACTION MAGNETIC FIELD

Filed Aug. 13, 1964 8 Sheets-Sheet 7

INVENTORS
ROBERT C. McMASTER
EDWIN D. SISSON
BY
MAHONEY, MILLER & RAMBO
BY Wm. V. Miller
ATTORNEYS INVENTORS
ROBERT C. McMASTER
EDWIN D. SISSON
BY
MAHONEY, MILLER & RAMBO
BY Wm. V. Miller
ATTORNEYS United States Patent Office 3,359,495
Patented Dec. 19, 1967

3,359,495

MAGNETIC REACTION TESTING APPARATUS AND METHOD OF TESTING UTILIZING SEMICONDUCTOR MEANS FOR MAGNETIC FIELD SENSING OF AN EDDY-CURRENT-REACTION MAGNETIC FIELD

Robert C. McMaster, Columbus, and Edwin D. Sisson, Worthington, Ohio, assignors to F. W. Bell, Inc., Columbus, Ohio, a corporation of Ohio Filed Aug. 13, 1964, Ser. No. 389,409
17 Claims. (Cl. 324—40)

This invention relates, in general, to apparatus and methods for nondestructive testing of materials. It relates, more specifically, to novel static and dynamic magnetic-reaction testing apparatus and method of testing which utilizes an eddy-current-reaction magnetic field to obtain an indication of a material's parameters and includes semiconductor means for sensing the magnetic fields.

With respect to this invention, static magnetic-reaction testing refers to a testing technique in which a magnetic field coupled with the material being tested is of a constant, non-time-varying magnitude and is maintained spatially fixed relative to the material. Dynamic magnetic-reaction testing refers to a testing technique in which a time-varying magnetic field coupled with the material being tested may be of a pulse, periodic or other specific waveform and may not be maintained in spatially fixed relationship to the material.

The extremely important field of nondestructive testing has several specific applications in the manufacturing area for process control and for monitoring of product quality. It also serves to check materials, components, structures and assemblies during maintenance for defects and deterioration and thereby permits appropriate repairs and replacements to prevent in-service failures. Nondestructive testing has been widely utilized in such applications for determining specific material properties or characteristics and for detection fo discontinuities and defects. These properties and characteristics include the electrical, magnetic, geometrical, mechanical, metallurgical structure and composition, etc. which may be related to the acceptability criteria of the material or article. One type of test apparatus which has heretofore been utilized for such nondestructive testing is classified as the eddy-current type and utilizes an induction coil to cause eddy currents to flow in the material or object under test and a sensing coil positioned to detect the resultant magnetic field. In those test situations where the eddy-current phenomenon provides a valid indication of the specific property under investigation, the prior-art apparatus has been found very useful although frequently its applications have been limited by its relatively low sensitivity and accuracy.

These characteristic disadvantages have resulted from the physical constructional features and the electrical operational characteristics of the prior art apparatus. Magnetic field flux lines are of a continuous nature but the fields are of nonuniform strength and decrease in intensity as the distance from the source of the magnetic field increases. The induction coil utilized in producing the eddy currents will necessarily have a finite size which is dependent on the electrical current requirements and physical limitations of the specific test application. Similarly, the sensing coil utilized with the induction coil must have a finite size which is dependent on the effectiveness of its detection of the resultant magnetic field. The physical constructional limitations also affect the electrical operating characteristics and determine the limitations thereof. A conventional sensing or pick-up coil comprises one or more turns of wire wound in series on a rigid supporting coil form. This detection arrangement is relatively inefficient due to its poor electromagnetic coupling relative to the magnetic field of the eddy currents in test materials. The second electrical operational characteristic affecting the sensitivity and accuracy of the prior-art apparatus is the loading effect on the induction coil. Eddy currents in the test material introduce an impedance change in the induction coil circuit and represent an electrical load on the induction coil. These at least make it difficult, if not impossible, to maintain standardized magnetizing forces. Also, any change in the circuit impedance resulting from a variation in test operation frequency will result in a change in magnitude and phase of the magnetizing current flowing through the induction coil, with consequent undesirable results on the test. Another disadvantage of the prior-art apparatus is its limitation in sensitivity at lower operating frequency ranges. Only with relatively high test frequencies will adequate variations in the output signal occur in response to differences in the electromagnetic and geometric properties of the test material. Further, the prior-art apparatus utilizing surface probe coils lacks the capability of separating the effects of differing variables in a particular test material. In addition, the prior-art apparatus must operate at relatively high frequencies to obtain a suitably-detectable response. Measurements with prior-art apparatus are generally relative in that a test material is compared with a standard specimen which has known properties or characteristics and this substantially limits the versatility of the prior-art apparatus.

It is, therefore, the primary object of this invention to provide a novel static and dynamic magnetic-reaction testing apparatus for nondestructive testing of materials having improved output signal resolution and greater adaptability to diversified testing applications.

It is another object of this invention to provide a novel nondestructive testing apparatus of this type which utilizes a magnetic-field-sensing, semiconductor device for providing an output signal responsive to a magnetic-reaction field which is a function of specific properties of the test material.

Another important object of this invention is to provide for static and dynamic magnetic-reaction nondestructive testing of materials, a novel testing apparatus having a broader operating-frequency range which extends into the very low frequencies, permitting testing of materials of greater thickness.

It is a further object of this invention to provide a novel testing apparatus of this type for the nondestructive testing of materials and to provide methods of testing utilizing the novel apparatus that result in greatly-simplified operating procedures and greatly-improved sensitivity and resolution of output signal.

It is another important object of this invention to provide a novel magnetic-reaction testing apparatus and method of nondestructive testing of materials which is selectively capable of both static and dynamic testing for vector analysis of phase relations and of separately determining specific magnetic and electrical properties.

It is still another object of this invention to provide, for nondestructive testing of materials, a novel static and dynamic magnetic-reaction testing apparatus having a magnetic-field-sensing semiconductor device which may be closely-coupled with the magnetic field of the test material for substantially one-hundred-percent electromagnetic coupling therewith.

It is also an object of this invention to provide a nondestructive testing apparatus of this type utilizing a Hall-effect, magnetic-field-sensing device which is highly-responsive to magnetic reaction fields and which may be ruggedly constructed in the form of a miniaturized detector probe.

These and other objects and advantages of the testing apparatus and method of testing will be readily apparent from the following detailed description thereof and the accompanying drawings.

Figure 6A:
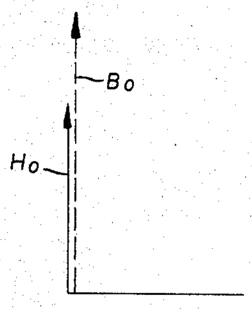
FIGURE 6 is a block diagram of an alternate basic circuit embodying this invention specifically adapted for static, D.C. magnetic field, type testing.
Figure 6:
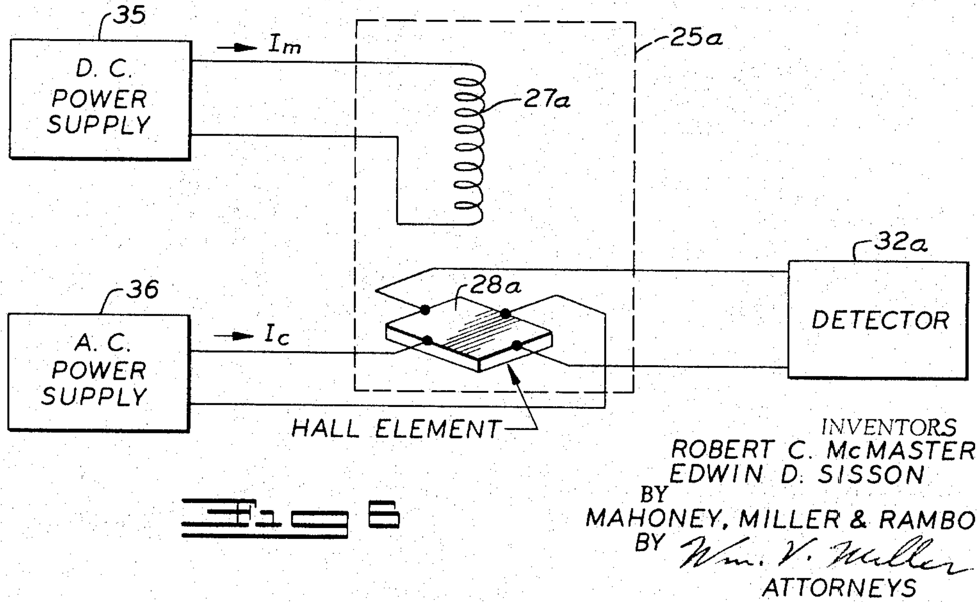

FIGURE 6*a* is a graphic representation of the magnetic field vectors resulting from the D.C. magnetic field operation of the apparatus of FIGURE 6.

Figure 7:
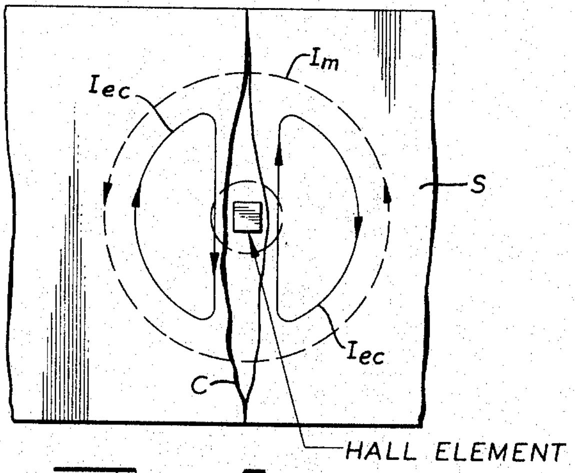

FIGURE 7 is a diagrammatic illustration of the eddy current paths resulting from operation of the apparatus in through-crack or similar discontinuity testing.

Figure 8:
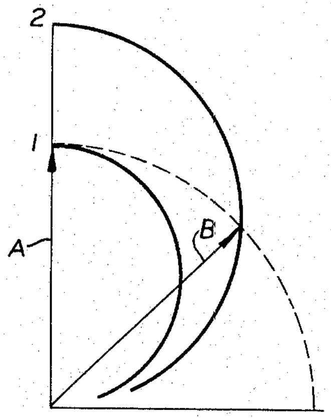

FIGURE 8 is a graphic representation of the vector loci of magnetic fields resulting from operation of the apparatus in testing of magnetic materials.

Figure 9:
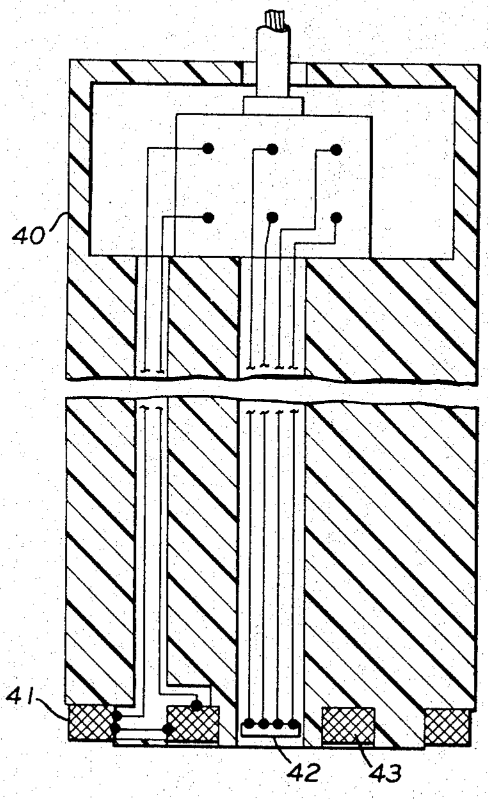

FIGURE 9 is a medial sectional view of a null-type test probe.

Figure 10:

FIGURE 10 is a graphic representation of the magnetic field vectors resulting from operation of the apparatus utilizing the null-type probe.

Figure 11:
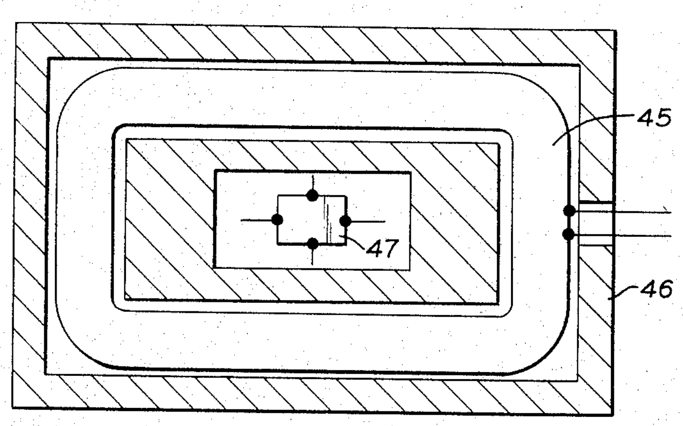

FIGURE 11 is a diagrammatic illustration of an alternate probe construction designed to obtain a polarization effect.

Figure 12:
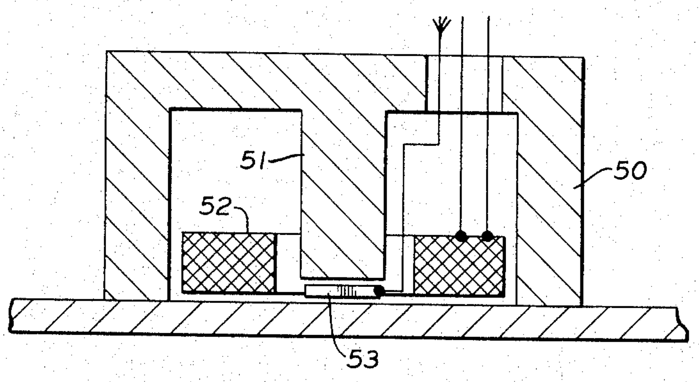

FIGURE 12 is a diagrammatic illustration of another alternate probe construction utilizing a ferromagnetic core.

Figure 13:
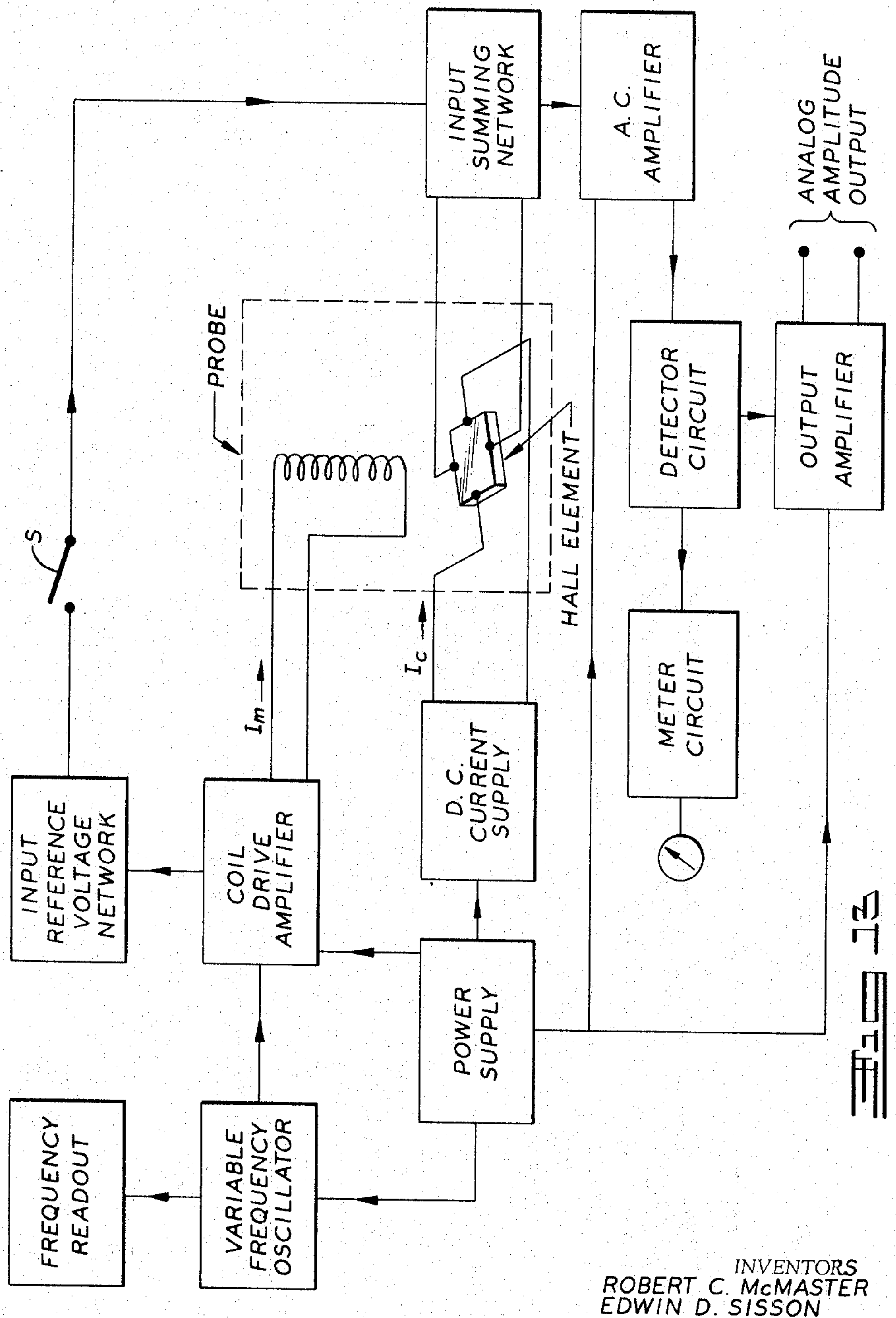

FIGURE 13 is a block diagram of a modified circuit for an eddy current-Hall element test apparatus adapted to provide an amplitude-type read-out.

Figure 14:
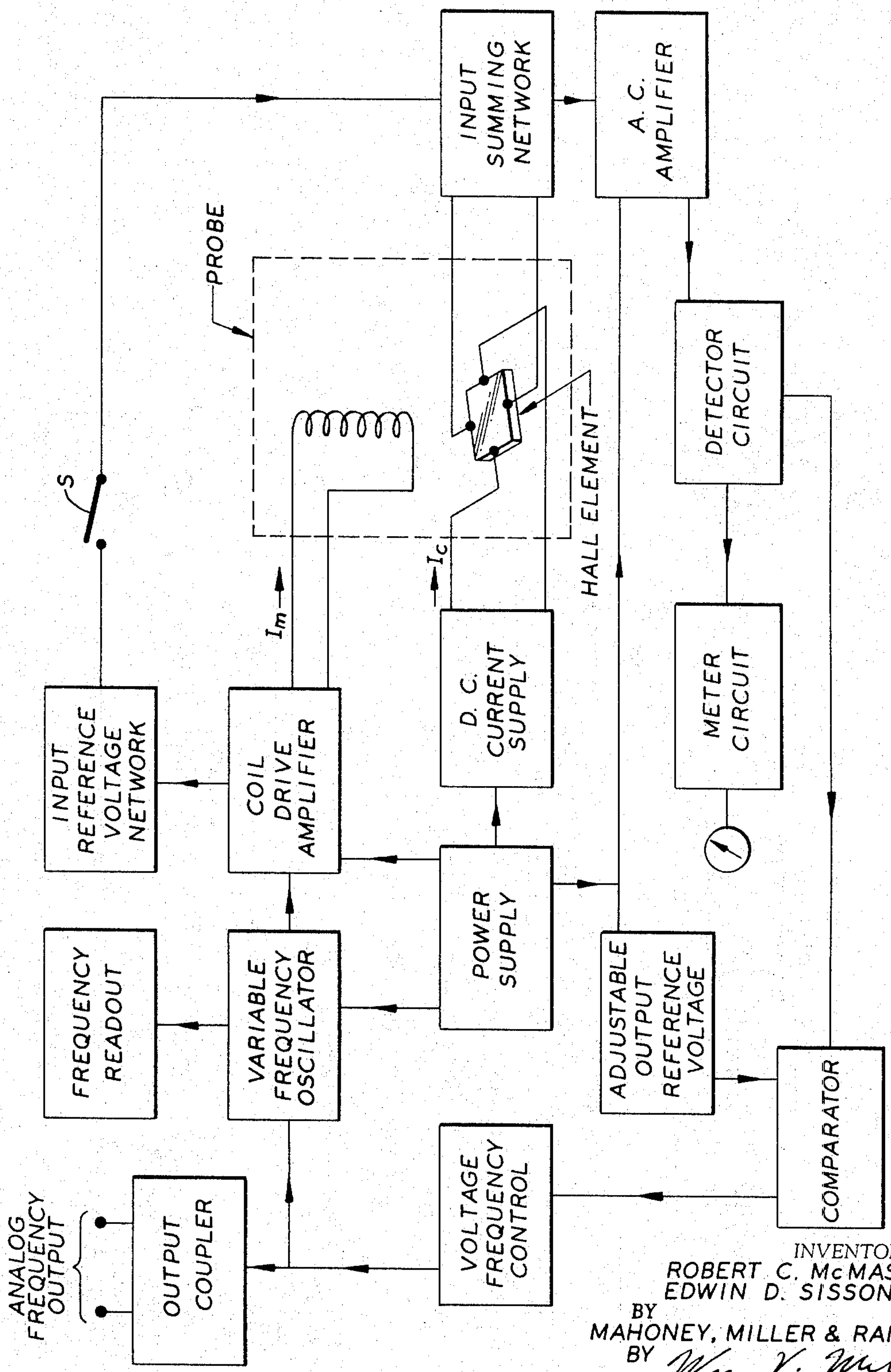

FIGURE 14 is a block diagram of a modified circuit for an eddy current-Hall element test apparatus adapted to provide a frequency-type read-out.

Figure 15:
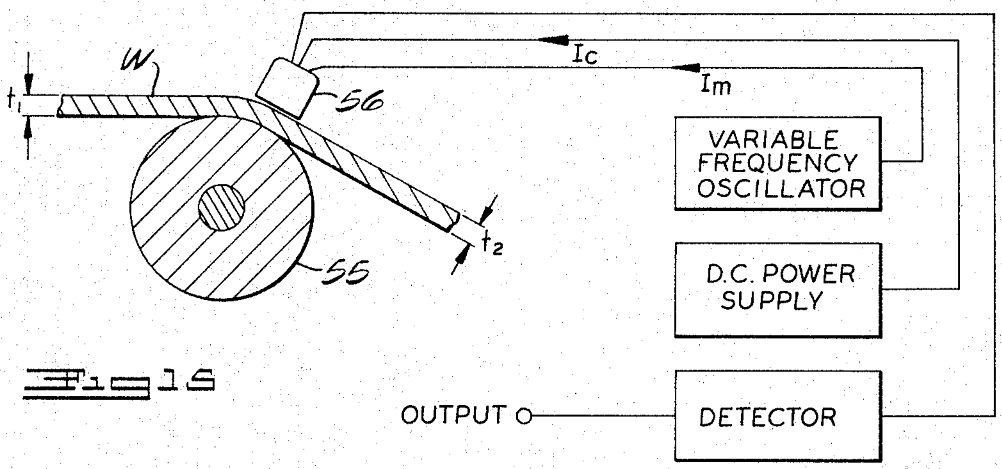

FIGURE 15 is a diagrammatic illustration of a test apparatus embodying this invention which is responsive to thickness variations in an elongated web of material which is not magnetic and not electrically conductive.

Figure 16:
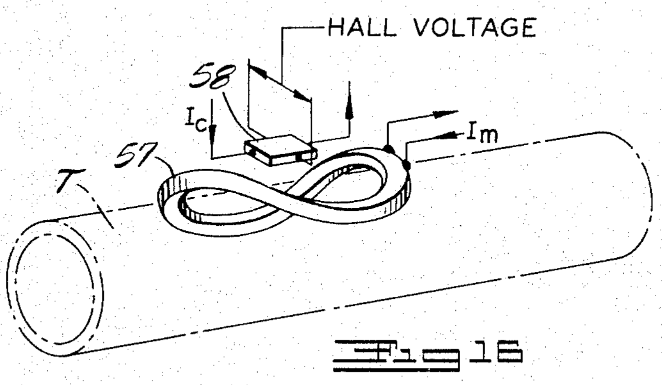

FIGURE 16 is a diagrammatic perspective view of a probe construction in which the magnetizing coil is of a shape conforming to the exterior surface of the test article.

Figure 17:
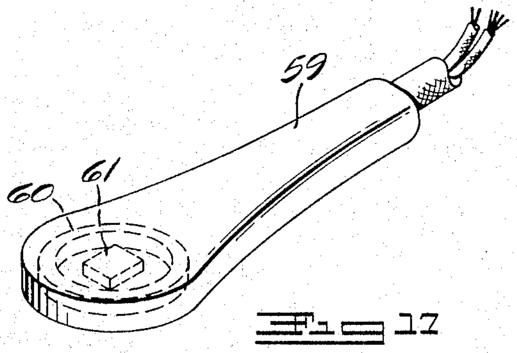

FIGURE 17 is a perspective view of a flat probe structure.

Figure 18:
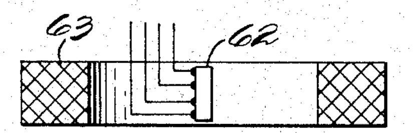

FIGURE 18 is a diagrammatical sectional view of a modified probe structure.

Figure 19:
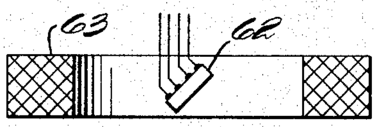

FIGURE 19 is a diagrammatical sectional view of a modified probe structure.

Figure 20:
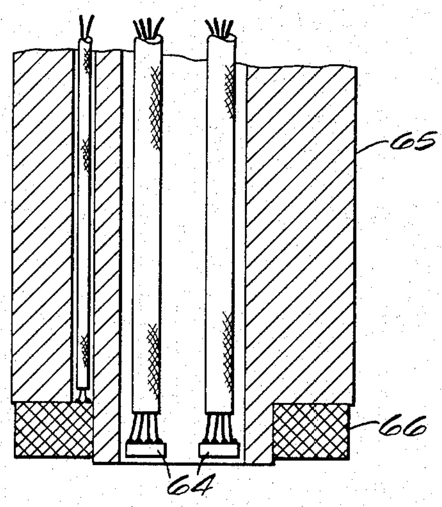

FIGURE 20 is a diagrammatical sectional view of a probe structure incorporating two Hall elements disposed in planar relationship.

Figure 21:
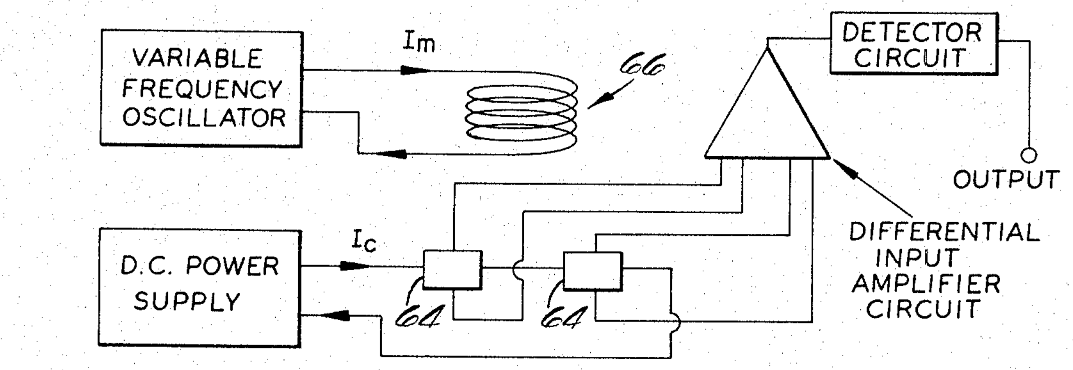

FIGURE 21 is a schematic diagram of a differential probe circuit utilizing the two Hall element probe of FIGURE 20.

Figure 22:
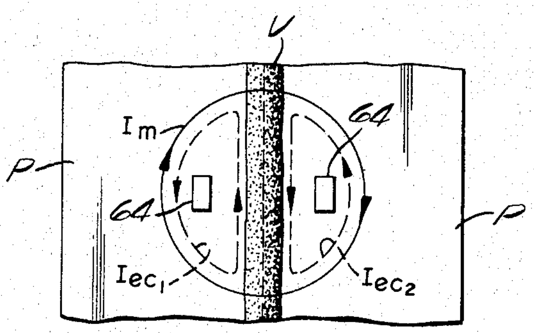
Figure 23:
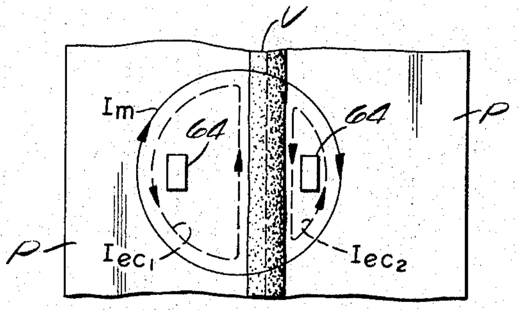
Figure 24:
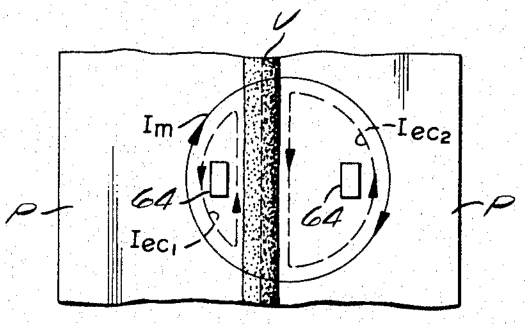

FIGURES 22, 23 and 24 are diagrammatic illustrations of the operation of the differential circuit of FIGURE 21 in determination of a weld seam.

The testing apparatus and method of testing of this invention comprise, in general, an electromagnetic induction coil for inducing a magnetic field in magnetically-coupled relationship with a test material and causing magnetization and eddy current flow in the specimen under test or in a material disposed in predetermined relationship to the coil, and a magnetic-field-sensing semiconductor device which is responsive to a magnetic-reaction field due to the permeability of the magnetic material or to the eddy current or to both in combination. The magnetic-reaction field, as distinguished from the applied magnetic field, is that magnetic field generated as a result of, and simultaneously with the flow of eddy currents according to Lenz's Law, and, in appropriate instances, to the permeability effect of the test material which effect enhances the field. Expressed as a vector quantity, the reaction magnetic field is the applied magnetic field subtracted from the net field. Basically, the mode of operation consists of producing a magnetizing field having a selected magnitude, frequency and geometry and then determining the effect on the test specimen on the resultant magnetic-reaction field by means of an output signal from the magnetic-field-sensing semiconductor device. In the present invention, the magnetic-field-sensing semiconductor devices comprise one or more Hall elements or magnetoresistive elements which provide operatively suitable output signals connected in an output signal circuit. The selection of the specific elements is a matter of design for optimum operation of the apparatus with a specific magnitude of magnetizing field. Appropriate calibration of the apparatus provides quantitative data necessary for a specific test.

Figure 1:
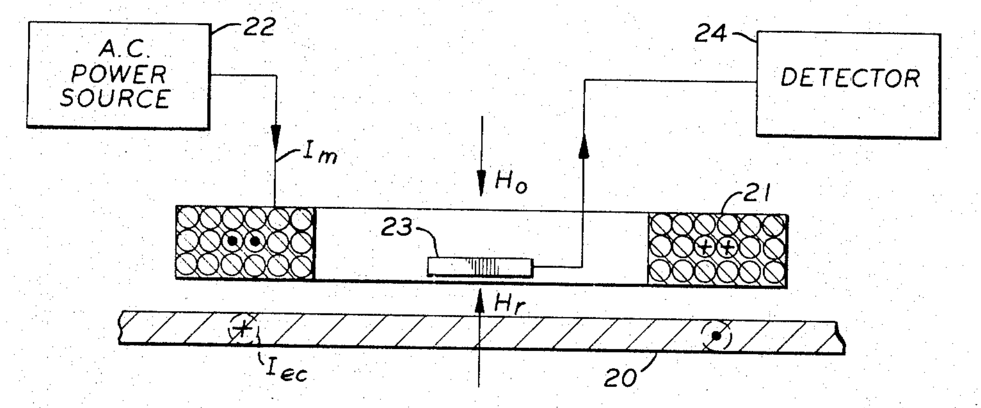
FIGURE 1 is a diagrammatic representation of a test apparatus embodying the invention including the basic operational elements and illustrating the principles of operation.
Figure 2:
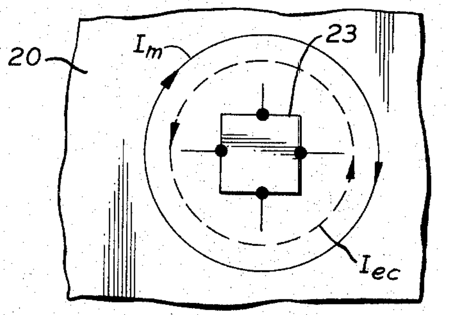
FIGURE 2 is a plan view of the current paths and field detector further illustrating the principles of operation shown in FIGURE 1.

The basic operation of the test apparatus of this invention is diagrammatically illustrated in FIGURES 1 and 2 as related to a test specimen 20. In this example, the test specimen 20 consists of a flat plate fabricated from an electrically-conducting material, which may or may not be magnetic, having one or more specific properties or parameters and conditions which are to be considered. An electromagnetic induction coil 21, shown as comprising one or more turns of an electrical conductor arranged in the well-known planar, circular shape, is positioned in close proximity to the test speciment with the coil being disposed in a plane substantially parallel to the surface of the test specimen. Connected to the coil 21 is an electrical power source 22 which is capable of providing a suitable magnetizing current $I_m$ for the specific application. An A.C. power source is shown and described for illustrative purposes although it is to be understood, and will be readily apparent, that the magnetizing current may be other than a conventional symmetrical, sinusoidal alternating current and may be a direct current, asymmetrical alternating current, pulse, rectangular or other wave form. The coil 21, when energized by the alternating magnetizing current produces a magnetic field which is designated as $H_o$ in the diagram and is effective in causing an eddy current $I_{ec}$ to flow in the test specimen in accordance with the well known relationship $$e=-N\frac{d\phi}{dt}$$

where $e$ is the induced electric potential causing eddy current flow. This eddy current $I_{ec}$ is symbolically shown in FIGURE 1 and flows in a direction generally opposite in circulation to the magnetizing current $I_m$ in the coil 21 and produces a magnetic-reaction field or eddy-current-reaction magnetic field designated as $H_r$. The eddy-current-reaction field is generally opposed to the magnetizing field $H_o$, having a specific vector relationship which is dependent on the test specimen parameters. Disposed within the coil 21 is a magnetic-field-sensing semiconductor device 23 of either the Hall element or magnetoresistive type which is responsive to the magnetic fields electromagnetically coupled therewith. The sensing device 23, which will be referred to hereinafter as a Hall element, is provided with conventional control current connections (not shown) which are connected to a suitable power source (not shown) and output signal terminals. The output signal terminals are connected to a detector apparatus 24 which may be a gaussmeter.

Thus, a magnetic field coupled with the Hall element 23 will produce an output signal which is related to the field and which is converted by the detector apparatus 24 into a suitable readout. The magnetic reaction field $H_r$ is related to the properties of the test specimen 20, and the detector 24 thus provides an indication of these properties.

Figure 3:
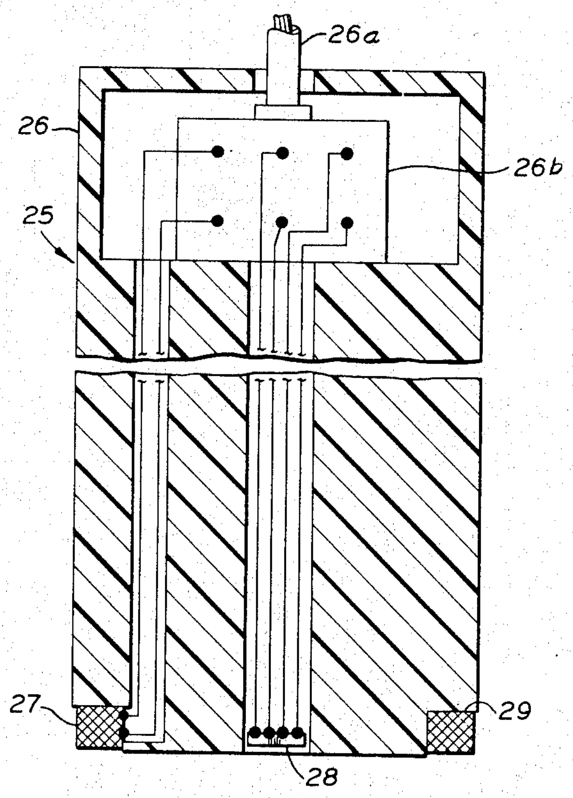
FIGURE 3 is a medial sectional view of a test probe.

The coil 21 and a Hall element 23 are advantageously assembled in a unitary probe unit 25 as is best shown in FIGURE 3. This probe unit 25 comprises an elongated, rigid tubular housing 26 formed from a nonmagnetic and electrically-insulating material and on which are carried an electromagnetic induction coil 27 and a Hall element 28. The housing 26 is of cylindrical shape having an integral coil form 29 fabricated at one end thereof in which a predetermined number of turns of a suitable electrical conductor are wound to form a circular coil 27 which lies in a plane parallel to the end face of the housing. By positioning the coil 27 in as close proximity to the end of the housing 26 as is mechanically possible, the coupling of the magnetizing coil with the test specimen will be optimized. The specific number of turns on the magnetizing coil is dependent on the particular application and is that number necessary to attain the desired ampere-turns throughout the test frequency range so as to produce adequate levels of magnetizing fields.

Axially positioned on the center line of the coil 27 is the Hall element 28. The Hall element 28 in the illustrated embodiment comprises a flat plate which is rigidly supported by the housing 26 in axial alignment with the axis of the coil 27 and as close as is feasible to the end face of the probe housing. This will position the Hall element 28 in close proximity to the surface of the test specimen; however, it is desirable that the Hall element be supported or mounted in such a manner that a mechanical force will not be exerted thereon through contact of the probe and the test specimen. Such a mechanical force acting on the Hall element would introduce a pressure effect and result in an erroneous reading. If necessary, a suitable shield or wear plate (not shown) may be attached to the housing 26 at the end face to prevent wear or pressure through contact with the test specimen.

Completing the assembly of the probe unit 25 are the electrical leads connecting with the magnetizing coil 27 and the Hall element 28. These leads include, generally, a pair of leads connected to the coil 27 to provide the magnetizing current, a pair of leads to provide a control current for the Hall element 28 and two leads for the Hall element output signal voltage. All of these leads are preferably formed in a single, flexible cable **26*a*, constructed to minimize internal and external magnetic and electric field coupling, for connection to the test instrumentation of the apparatus. A terminal board 26*b*** may be mounted within the housing for leadwire termination.

In the utilization of the test probe 25, the several leads may be connected as indicated in FIGURE 1 with respect to the alternating current power source and the detector apparatus. This basic circuitry is diagrammatically illustrated in FIGURE 4 with the probe 25 connected to a variable-frequency oscillator 30 for driving the magnetizing coil, a direct current power supply 31 providing the Hall element control current $I_c$ and a detector circuit 32 which provides an indication of the Hall element output signal. The probe 25 is initially calibrated by a suitable technique to provide the desired readout with the specific type of detector utilized in a particular test application. Depending on the specific parameter or characteristic condition of the test specimen which is to be ascertained, the variable-frequency oscillator 30 would be set to provide a magnetizing current $I_m$ of predetermined magnitude and frequency for driving the magnetizing coil 27. This magnetizing current $I_m$ will produce a magnetizing field $H_o$ which will have a spatial component directed axially of the probe 25 and effective in acting on the Hall element 28 to produce a Hall output voltage. When the probe 25 is isolated from the test specimen or any other body which could affect the magnetic field, which is the case when the probe is remote from the test specimen, the magnetic field $H_o$ thus produced will result in a specific Hall voltage as noted by reference to the detector 32. Subsequent positioning of the test probe 25 in close proximity to the test specimen will result in a magnetic-reaction field or eddy-current-reaction field from the induced eddy current flowing in the test specimen to an effective penetration depth dependent on the frequency of the magnetizing current $I_m$ and circulating in a direction opposite to that of the magnetizing current. As a consequence of this eddy current, a magnetic-reaction field $H_r$ will be produced which is directed in a generally opposite direction to the magnetizing field $H_o$ and with a phase displacement as illustrated in FIGURE 5.

This magnetic-reaction field $H_r$ will also affect the Hall element 28 and, in the case of homogeneous electrically-conducting, non-magnetic material, result in a reduction in the Hall output voltage. The reduction in the Hall output voltage as a consequence of the reaction field $H_r$ is related to the parameters or characteristics of the material under test and can accordingly be utilized in providing a qualitative indication of the parameters or characteristics of a specific test specimen.

The vectorial summation of the result of magnetizing field $H_o$ and the magnetic-reaction field $H_r$ is ascertained by the detector 32 in this basic circuit arrangement. These vector relationships are readily understood from FIGURE 5 which graphically represents these magnetic force vectors in a complex H-plane with the resultant magnetizing force designated as $H_n$. The vector relationships as a function of frequency are best shown in this diagram which also demonstrates the relative advantage of the present apparatus over the prior-art search or pick-up-coil-type instruments. The resultant magnetizing force traces out a semicircular curve in which $H_n$ is at a maximum as at the upper portion of the curve when the frequency is at a minimum; however, the sensitivity to changes in $H_n$ is extremely low at low frequencies because the magnitude of $H_n$ remains nearly constant and therefore destroys the usefulness of low-frequency testing when utilizing the prior-art apparatus which is only responsive to $H_n$. This limitation as to low-frequency range of operation is diagrammatically illustrated in FIGURE 5 by vectors $H_n'$ and $H_n''$. It is apparent that a similar per unit change in magnetic reaction in the low-frequency range will thus produce a relatively smaller change in the magnitude of $H_n$ than at higher frequencies and a difference between two tests will be difficult to determine. However, within a middle range of operation, a similar unit change in either frequency or reaction field $H_r$ will effect a proportionally larger change in the resultant magnetic field $H_n$. In the higher range of frequencies at the lower end of the curve, the per unit changes in $H_n$ will remain relatively large for similar changes in the frequency or reaction field.

As will be subsequently explained in further detail, the apparatus of the present invention is also capable of directly measuring the magnetic-reaction field $H_r$ which is a distinct improvement over the prior-art apparatus. Utilization of a magnetic-field-sensing semiconductor element permits the advantageous measurement of the magnetic-reaction field $H_r$ in the low-frequency range as such an element is equally sensitive to low-frequency magnetic fields. This low-frequency sensitivity coupled with the magnetic-reaction field $H_r$ measuring capability permits measurements in the low-frequency range with a relatively high degree of resolution for the same reason that the $H_n$ field measurements may be made with a high degree of resolution in the medium and high-frequency ranges. Thus, as will be seen by reference to FIGURE 5, the per unit change in the magnitude of the $H_r$ field will also be relatively great in the low-frequency range.

The prior-art search-coil-type instruments have been found to have optimum sensitivity in a limited operating range, which range is indicated as A on the diagram of FIGURE 5 for illustrative purposes, as a consequence of the above-mentioned factors. In contrast to this relatively limited range, the novel magnetic-reaction testing apparatus of this invention has been found to have an improved sensitivity over a relatively larger practical operating range with commercially feasible instrumentation as a consequence of the uniform sensitivity of a Hall element over the entire frequency range. The Hall element output signal level is independent of frequency and is dependent only on the magnitude of the magnetic fields. This increased range of operation is indicated relatively by the arc designated B in FIGURE 5 and has been found to extend the testing range with respect to the lower ranges of test frequencies to essentially zero frequency. A further advantage of the apparatus of this invention over the prior-art apparatus is the relatively small physical size of the magnetic-field-sensing elements that it is possible to achieve with semiconductor devices such as a Hall element. The small thickness dimension with which it is possible to construct Hall elements enhances the electromagnetic coupling thereof with specimen and also provides a higher surface resolution for detecting small localized magnetic field non-uniformities. With a Hall element, it is possible to attain substantially one-hundred percent electromagnetic coupling with the specimen. An advantage of low-frequency test operations is the relatively greater eddy current depth pentration in the test specimen obtainable at low frequencies and which is necessary to obtain a valid response to the parameters in thick specimens. More complete information as to the parameters of a test specimen can thus be obtained by the apparatus of this invention. Both magnetic field vector magnitudes $H_r$ and $H_n$ can be accurately determined and, by utilization of the circle locus diagram as shown in FIGURE 5, the relative phase relationships may also be determined. The improved resolution and increased operating range obtained by the present invention result from the use of a Hall element and the test probe construction and from the capability of the present apparatus to measure both $H_n$ and $H_r$ vectors as will be more fully described hereinafter.

The operation of the magnetic-reaction-field testing apparatus of this invention has been heretofore described in conjunction with an alternating-type magnetic field as produced by the probe coil. However, as stated in the introduction, the apparatus is also operable with a zero-frequency magnetizing field which will not produce eddy currents and is of advantage in determining the static magnetic properties of a test specimen such as the magnetic permeability. Operation of the apparatus with a direct current probe coil magnetizing current is illustrated by the block diagram of FIGURE 6. This circuit in its basic form comprises a direct current power supply 35 to a probe coil 27*a*, a Hall element 28*a* with an alternating current supply 36, and a detector 32*a*. This circuit arrangement provides a direct-current magnetization current $I_m$ which produces a static magnetic field. An A.C. current supply 36 is utilized for providing the control current $I_c$ for the Hall element 28*a* to obtain an A.C. Hall output so that A.C. amplifiers can be used and thereby avoid disadvantages of D.C. amplifiers such as the drift characteristics. However, it is to be understood that the control current may also be of the direct current type if desired and, in this instance, the detector would necessarily be of a type adapted for operation with D.C. signals. In the D.C. magnetic field operation of this circuit where there are no eddy currents, the magnetic reaction field $H_r$ will be zero and the resulting field $H_n$ is equal to the magnetizing field $H_o$, for nonmagnetic materials, which is graphically illustrated in FIGURE 6*a*. In the case of magnetic materials, the resultant field will be increased by the effective permeability of the test material to the value $B_o$ as shown in FIGURE 6*a*.

Figure 4:
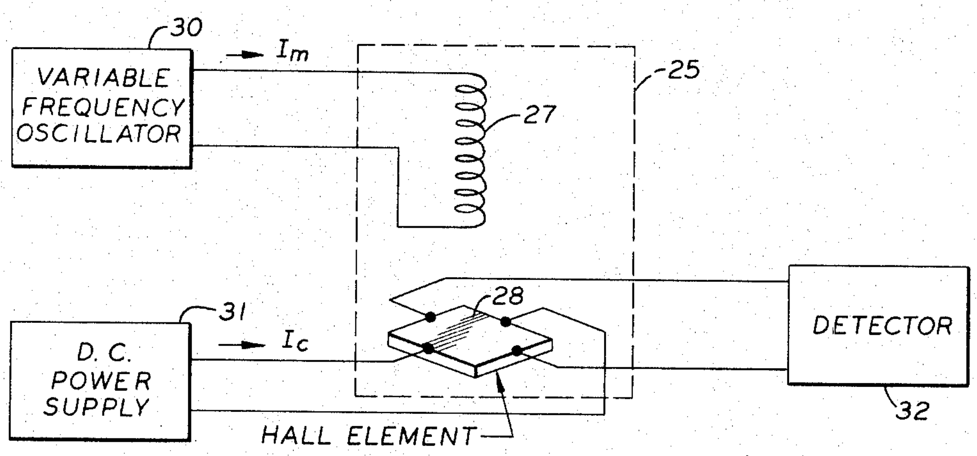
FIGURE 4 is a block diagram of a basic circuit embodying this invention specifically adapted for dynamic type testing.
Figure 5:
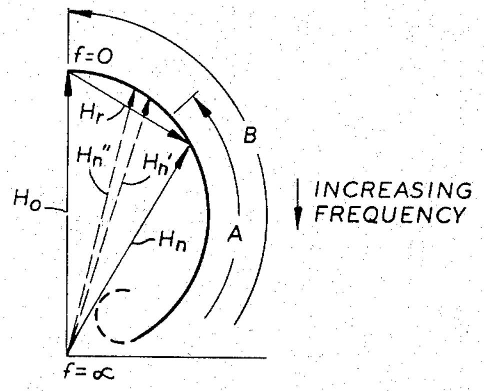
FIGURE 5 is a graphic representation of the magnetic field vectors resulting from the operation of the apparatus.

A specific example of the utilization of the test apparatus of this invention of the form of FIGURE 4 is in the detection of cracks in a test specimen wherein the cracks extend the depth of the specimen and are referred to as through-cracks. Assuming that a crack C extends appreciably beyond the radius of the magnetizing coil having a diagrammatically representative magnetizing coil current $I_m$, as is illustrated in FIGURE 7, a magnetizing field normal to the specimen S will cause an eddy current to tend to flow in a path substantially similar to the magnetizing current $I_m$. This eddy current path will be broken into two distinct circulating current paths $I_{ec}$ which are separated by the crack and flow in opposite directions adjacent the crack. The effect of the counterflow of eddy currents on either side of the crack is to produce an effective eddy current encircling the Hall element at a much smaller radius than the normal eddy current flowing in a similar specimen devoid of cracks. A decrease in the effective radius of the eddy currents and their proximity to the Hall element greatly amplifies the magnetic reaction as detected by the Hall element when the Hall element is positioned immediately over or adjacent to the crack. Discrimination as to cracks or similar discontinuities is further enhanced by a reversal of the indication due to the reverse counterflow of eddy current at the crack. Thus, movement of a probe across the surface of a test specimen containing through-cracks or similar discontinuities will readily indicate such discontinuities through a reverse indication of relatively large magnitude by the detector. The crack C is shown as extending completely across the test specimen S to eliminate the possibility of the eddy currents flowing around the crack in the relatively narrow specimen. Where the crack is of sufficient extent with respect to the magnetizing coil diameter as to prevent any significant eddy current flow around the crack, it will be apparent that the same advantageous results will be obtained even though the crack does not extend completely across the test specimen.

This advantage of the test apparatus of this invention over the apparatus of the prior art as to the greatly improved sensitivity in crack detection is readily apparent. In the prior art apparatus utilizing a search coil identical to or essentially coincident to the magnetizing coil, the search coil is responsive to the total magnetic flux emanating from the specimen within the area of the search coil and there will only be a reduction due to the area of the crack. Prior art instrumentation connected to a search coil will accordingly only indicate a reduction in the normal or standard $H_n$ reading as the coil passes over the crack, which is a much smaller change than is experienced by the apparatus of this invention utilizing a Hall element pickup device with an extremely small sensing area as compared to the area of the magnetizing coil. While the improved response in the detection of cracks has been illustrated and described as related to internal cracks, it will be apparent that a similar advantageous result is obtained in determining the edge or end of a specimen as well as other sharp discontinuities. Thus, the apparatus may also be incorporated in equipment relying on edge registration for the specific operating or control factor as in contour-following or guidance mechanisms.

Another example of the utilization of the test apparatus of this invention demonstrating the usefulness thereof is in conjunction with the testing of magnetic materials. In the previous description of the operation of a basic apparatus embodying the invention, it was assumed that the specimen being tested had a permeability factor substantially equal to that of air or unit, except as noted on page 16. Since the eddy current magnetic field opposes that of the magnetizing coil, the detector utilized in the basic apparatus would indicate a "down-scale" or lesser reading when the probe is positioned on or in close proximity to a conducting, nonmagnetic test specimen in comparison to the indication when the probe is remote. In the case of magnetic materials, ferromagnetic for example, having a permeability greater than unity, the field of the magnetizing coil of the probe will tend to have a greater effect with a relative increase in the magnetic-reaction field due to the lower effective reluctance of the magnetic flux paths resulting in "up-scale" or greater indications by the detector when the probe is positioned on or in close proximity to the test specimen and operates in the lower frequency range.

This unique feature permits operation of the apparatus to provide a digital readout that is related to the parameters under consideration. The detector in the basic apparatus previously described is only capable of providing an indication of magnetic field vector magnitudes and relates the specific specimen under test to a standard such as the indication with the probe positioned remotely from the specimen. Increasing or decreasing the frequency of the magnetizing current will effect a corresponding change in the resultant magnetic field $H_n$ as ascertained by the detector. It is possible to obtain no change in the magnitude of indication of the detector as between the readings with the probe either on or remote from a conducting, magnetic specimen by appropriate selection of the frequency of the magnetizing current of the probe coil. This technique is graphically illustrated in FIGURE 8 where the vector A represents the detector reading with the probe remote from the specimen where the permeability factor is unity. The magnetic field $H_n$ represented by A would accordingly be determined by the respective unity permeability curve. Subsequently positioning the probe on a material having a permeability factor greater than unity will cause the detector to indicate a larger relative value. However, it is possible to adjust the frequency of the magnetizing current to balance the magnetic and conductivity effects and thus obtain the same magnitude indication when the probe is remote or positioned on or in proximity to the specimen. This balancing is possible at only one characteristic frequency for a specific test specimen and may be accordingly related to a particular set of parameters. The balance frequency can be read out digitally with high resolution which readout is specifically applicable to automated control systems. Automation is further enhanced in that the difference signal is directional and can be readily utilized to provide an appropriate corrective signal for obtaining a null or balance.

The basic apparatus and test procedure hereinbefore described is responsive to the resultant magnetic field vector $H_n$ and has optimum operation at higher frequencies. A modification of the test probe, referred to as a null-type, as shown in FIGURE 9, cancels the open probe signal and permits measurement of a magnetic-reaction signal which is related to the parameters of the specimen and provides a high degree of resolution in the low-frequency range. The null-type probe structure is of the same general configuration as that previously described and includes a housing 40, an electromagnetic induction coil 41 and a Hall element 42. The coil 41 is disposed adjacent the end of the housing 40 with the Hall element 42 also axially aligned therewith and usually centrally disposed within the coil. In this modification, an additional electromagnetic coil 43 is provided which is of smaller size than the coil 41 and is disposed in the same plane therewith and in axial alignment with the Hall element 42. The second coil 43 comprises a lesser number of turns than the first coil and, in the present embodiment, is series-connected with the first coil. The direction of winding 43 is reversed to provide an oppositely-directed magnetic field. In the construction of this probe, the number of turns is adjusted to provide a magnetic field equal and opposite to that produced by the first coil 41 within the area of the second coil 43 and thereby eliminate any magnetic field effect on the Hall element 42 when the probe is remote from the test specimen.

Nulling of the magnetic field with respect to the Hall element 42 provides an advantageous method of operation in which the eddy current magnetic-reaction field having a high degree of resolution in the low-frequency range may be readily measured. Placement of a null-type probe in operative relationship with the surface of a test specimen, assuming the probe is incorporated in a basic circuit similar to that shown in FIGURE 4, will similarly cause an eddy current to flow in the test specimen. This eddy current will then produce a magnetic-reaction field directly related to the parameters or conditions under consideration and it is only this magnetic field that will be effectively electromagnetically coupled with the Hall element 42. FIGURE 10, which is a vector diagram of the magnetic fields similar to FIGURE 5, clearly demonstrates this advantage in the relationships of these magnetic fields. The apparatus is now capable of operating in a relatively lower frequency range than is practically feasible with a probe constructed as illustrated in FIGURE 3. As an example, two magnetic-reaction fields designated as A and B are illustrated which may be related to a standard specimen and test specimen with a parameter deviation, respectively. As is apparent from this diagram, the difference between the two reaction fields may be small and the magnitude of the fields is also small but relatively large percentage changes occur.

The "lift-off" effect may be utilized in determining the properties of the test specimen. "Lift-off" consists of displacement of the probe from the surface of an electrically-conducting body and will effect a decrease in the magnetic-field reaction operative on the Hall element as the separation increases. Assuming that the electrically-conducting body has known, standard properties, the lift-off effect may be advantageously utilized in determining geometric properties of the surface or of surface coatings. For example, the thickness of a nonconducting, nonmagnetic coating on an electrically conducting and/or magnetic body, such as a metal sheet, may be readily ascertained by this apparatus as variations in the thickness of the coating may be utilized to vary the relative displacement of the probe from the surface of the metal sheet and thereby effect a variation in the output signal of the apparatus. The thickness of materials or coatings which are neither conducting nor magnetic may be readily determined by this technique as displacement of the probe from the surface of the metal sheet will effect a marked change in the output signal when the displacement is relatively small. In thickness measurement of nonconducting and nonmagnetic materials, the material may be backed by a cylindrical counterpiece which is an electrically-conducting body which will provide the necessary magnetic reaction. As an example of the utilization of this technique (see FIGURE 15), an elongated or continuous web W of the material to be tested having variations in thickness such as $t_1$, and $t_2$ may be drawn over a cylindrical backing roller 55 which has the necessary electrically-conducting and/or magnetic characteristics. Placement of the probe 56, which is connected with a variable frequency oscillator, D.C. power supply and detector circuit, in contact with the surface of the web W will provide a specific indication for a specific thickness. Any variations in the thickness of the web W will accordingly vary the displacement of the probe 56, from the backing roller 55 and thereby effect a change in the indication of the apparatus. Variations in thickness of the sheet material or web W will produce a corresponding indication by the apparatus which, if desired, may be utilized in automatic control systems associated with the production of the sheet material. A "tilting" effect can also be utilized in determining the relative angular displacement of the test specimen and the probe face as any angular displacement of the magnetic-reaction field will also effect a reduction in the Hall element output voltage.

Heretofore, the magnetizing coil of the probe has been shown and described as being of a circular shape and formed in a flat plane with the Hall element centrally and axially positioned in the plane of the coil. This specific probe construction may be readily modified for particular applications as determined by physical structure of the test specimen or unique electrical and magnetic characteristics. As an example of the physical structure limitations which may be encountered, the surface of the test specimen may be curved as would be the case in testing of elongated tubular articles T as shown in FIGURE 16. In such an application, the end face of the probe housing (not shown) may be similarly curved with the probe magnetizing coil 57 also having the same configuration for the most advantageous coupling and the Hall element 58 disposed centrally of the coil. Also, the probe housing 59 may be formed as a flat plate (see FIGURE 17) with the minimum thickness being limited by the specific structure of the probe coil 60 with the Hall element 61 centrally disposed of the coil. A flat, wafer form probe such as this may be advantageously utilized in testing of specimens having restricted access spaces such as boiler tubes, heat exchangers or nuclear reactor fuel plates.

A further example of probe construction is illustrated in FIGURE 11. In this embodiment, the coil 45 is of rectangular form with the end dimension being relatively small in comparison to the length and mounted on a suitably-formed probe housing 46. The Hall element 47 is supported centrally of the coil 45 in axial alignment therewith. A probe thus constructed will form generally rectangularly-shaped eddy-current flow paths in the test specimen which are effectively polarized in the test specimen. A test specimen which has a different resistance to circulation of eddy currents in one direction rather than in another direction, such as a laminated metallic sheet structure in which the thickness of each sheet is substantially less than the longitudinal dimension of the probe coil, will, therefore, have a readily detectable sheet orientation by the apparatus of this invention utilizing a probe of this type. Rotation of the probe about its axis will provide an indication related to the maximum and minimum resistance to the eddy currents. The effect of shaping the eddy-current field to obtain the polarization may also be utilized in respect to the probe construction of FIGURE 9. The nulling coil 43 of this probe may be formed with a larger diameter than shown to substantially confine the eddy currents to the area immediately below the magnetizing coil.

Another modified probe construction is illustrated in FIGURE 12. This probe comprises a cup-shaped ferromagnetic core 50 having a central core projection 51. A circular magnetization coil 52 is disposed within the annular cavity of the core with a corresponding decrease in the reluctance of the magnetic circuit as the magnetic flux will flow through the core. The Hall element 53 is fixed on the end of the core projection 51 and is subject to the concentration of the flux in this area. Among the advantages of the ferromagnetic-core probe construction is the increase in output signal levels obtainable with a specific coil magnetization current. Another advantage is the magnetic shielding for the Hall element which is provided by the core. Also, since the magnetic flux is concentrated in the pole pieces, it is possible to obtain the polarization effect previously described through appropriate shaping of the core.

Although only symmetrical probe constructions have been shown, it is to be understood that probes may be otherwise formed as required for specific applications. The Hall element has been previously described as axially-centered relative to the magnetizing coil and it is readily apparent that the Hall element may be displaced therefrom provided the effect of such displacement is considered in the operation thereof. For example, the Hall element may be positioned adjacent the magnetizing coil or the Hall element 62 may be oriented with the magnetic axis thereof out of alignment with the magnetic axis of the coil 63 as shown in FIGURES 18 and 19 to the extent that it is disposed in quadrature or at an intermediate angle to the previously illustrated Hall element orientation. Two or more Hall elements may be incorporated in the probe assembly in planar, parallel or quadrature relative orientation to provide a differential probe to detect local property variations. A probe structure in which two Hall elements 64 are disposed in planar relationship is illustrated in FIGURE 20. The two Hall elements 64 are suitably supported in fixed relationship in a central bore of the probe housing 65 which also carries the magnetizing coil 66 in coaxial relationship to the Hall elements. Many other coil geometries to modify eddy current paths and Hall element detector locations and orientations to detect specific directional components of the magnetic field are feasible as is readily apparent. As a further example, the Hall element may be positioned on the opposite side of the test specimen from the magnetizing coil.

For illustration of an application of the differential probe structure of FIGURE 20, such a probe is shown in FIGURE 21 connected in circuit with a differential circuit for operation in accordance with this invention. A variable frequency oscillator is connected in circuit with the magnetizing coil 66 to supply the magnetizing current $I_m$ and a D.C. power supply providing the Hall element control current $I_c$ is series connected with the two Hall elements 64. Using a series connection for the control current terminals assures that the same control current $I_c$ will flow through each Hall element 64. The Hall voltage output terminals of each Hall element are connected in circuit with a differential input amplifier circuit which is of well known construction and operation with the Hall voltages opposing each other whereby the differential circuit will provide a signal to a detector circuit which is related to the difference between the two Hall voltage input signals supplied to the differential circuit. When the Hall element input signals are of equal magnitude, the signals effectively cancel each other and the detector circuit will provide a zero output. However, at any time there is a dissimilarity in the Hall element input signals as a consequence of variations in the sensed magnetic fields, there will be a resultant output signal from the differential circuit which is related to the difference between the two Hall voltages and which is of a specific polarity thereby indicating the existence of a localized discontinuity and its directional displacement relative to probe. Information as to directional displacement is obtained as the magnitude of the respective Hall voltages are related to the displacement of the Hall element from the discontinuity. As the displacement of one Hall element relative to the discontinuity increases, the displacement of the other will decrease resulting in a reversal of the differential circuit output signal polarity as the probe traverses the discontinuity. Such a circuit and probe is of particular advantage in determining through cracks or edge discontinuities as illustrated in connection with the probe of FIGURE 7. With such a reversal in polarity, the differential circuit output signal is particularly useful as an error correcting signal for a servo mechanism (not shown) which may be operatively associated with the probe to maintain the probe in predetermined relationship to a discontinuity such as an edge or a weld seam for a tracking operation. Operation of the differential probe and circuit of FIGURES 20 and 21 for a weld tracking operation is clarified by reference to FIGURES 22, 23 and 24. A weld seam V between two plates P which are joined at their edges will be determined as an electrical discontinuity in the same manner as the through crack of FIGURE 7 since the weld seam will have an electrical resistance which is dissimilar to that of the adjacent plates joined by the weld. With the probe centered relative to the weld seam V as shown in FIGURE 22, the magnetizing current $I_m$ of this coil will induce two distinct eddy current patterns $I_{ec_1}$ and $I_{ec_2}$ which will be separated by the weld seam V as previously described in connection with FIGURE 7. With the Hall elements 64 symmetrically disposed to the weld seam V and respective eddy currents $I_{ec_1}$ and $I_{ec_2}$ as shown in FIGURE 22, the Hall output signal will be of equal magnitude resulting in a zero output signal. Displacement of the probe from a relatively centered position to either a left or right position as shown in FIGURES 23 and 24, respectively, will result in an increase in the Hall voltage signal of one Hall element and a concurrent decrease in the Hall voltage signal of the other Hall element with the magnitude and polarity of the resultant differential circuit output signal being indicative of the degree and direction of displacement of the probe relative to the weld.

A more complete circuit for a test apparatus embodying the invention is shown by the block diagram of FIGURE 13. This circuit includes the basic apparatus of the elementary circuit of FIGURE 4 with the sub-units of the several components indicated. The variable-frequency oscillator is connected to the magnetizing coil of the probe through a drive amplifier which is designed to maintain a constant probe coil A.C. magnetizing current $I_m$ regardless of the test frequency selected or the loading effects of the eddy currents. Good accuracy and excellent reproducibility of measurement is obtained as a result of maintenance of standard test conditions, such as a standard magnetizing field, to obtain consistency of information. The power source, a coil-drive amplifier connected to the probe magnetization coil, must be capable of maintaining a constant-magnitude A.C. magnetization current $I_m$ irrespective of any loading effect resulting from eddy currents or ferromagnetic reaction. Similarly, the D.C. current supply must also be capable of providing a substantially-constant Hall element control current $I_c$. Initially, the Hall votage output is fed into a summing network and the resultant signal of the summing network is then fed into an alternating current or A.C. amplifier and then to a detector circuit. The detector circuit in the illustrated embodiment is utilized to drive a meter circuit and an associated visual readout meter. A variable-frequency oscillator is connected to the input of the coil-drive amplifier to provide the desired magnetizing current for the specific test. Preferably, the oscillator is of the type which is capable of providing a zero-frequency signal for convenience of operation in permeability testing. Similarly, the Hall element control-current supply is also preferably of a type capable of providing an A.C. control current $I_c$ as the output signal will thus continue to be of the alternating current type.

Connected to the detector circuit is an output amplifier which, in this amplitude mode of operation, provides an analog amplitude output related to the resultant magnetic reaction $H_n$. The resultant magnetic reaction $H_n$ is the vector sum of the open probe magnetization force $H_o$ and the eddy current reaction field $H_r$. This analog amplitude output may be readily utilized to drive a control system in automated manufacturing operations to effect changes necessary to maintain consistency of quality of product. An additional output or indication is provided by this circuit which consists of a frequency readout driven by the variable-frequency oscillator. This frequency readout may be conveniently utilized in conjunction with the null type of testing described in conjunction with FIGURE 8.

Shown as selectively-connectable in the circuit of FIGURE 13 by a switch S is an input reference voltage network. This network is connectable between the coil-drive amplifier and the summing network and is operable to permit the advantageous direct determination of the magnetic reaction $H_r$. With the switch S in the open position, the Hall element will provide an output signal which is related to the resultant magnetic field $H_n$. Closing of the switch S introduces a signal to the summing network which is related to the magnetizing current $I_m$ or the magnetization field $H_o$. This signal or reference voltage is in phase with the signal resulting from the "empty coil" magnetization field $H_o$ although of opposite polarity and is of equal magnitude through appropriate circuit design. Consequently, the reference voltage signal will effectively cancel the magnetization field component $H_o$ from the Hall output signal $H_n$ and provide a direct indication of the magnetic-reaction field $H_r$. The major advantage of direct determination of the magnetic reaction $H_r$ is that, along with $H_n$, the exact operating locus on the complex H-plane (see FIGURE 5) may be readily ascertained, permitting phase analysis of the specimen whereby specific parameters may be ascertained. Another advantage is that low-frequency measurements are thus permitted without a loss of sensitivity and accuracy. This magnetization field cancellation technique has several other advantages over the nulling probe which enhance its operation. Among the advantages is the elimination of the reduction of the magnetizing field at the probe or test specimen as is the case with a nulling coil. The magnetization coil may be constructed as desired and, therefore, permits further miniaturization of the probe since there is no need to include a nulling coil. Also, nulling may be readily accomplished for any specific operating conditions through relatively simple circuit adjustments.

A circuit similar to that of FIGURES 13 is illustrated in FIGURE 14 and is designed for a frequency mode of operation. This circuit differs with respect to the output of the detector circuit which is now utilized to automatically control the operating frequency of the variable-frequency oscillator. An input reference-voltage network is selectively connectable in the circuit to permit operation by means of determination of either resultant magnetization $H_n$ or the magnetic reaction $H_r$ as described in conjunction with the circuit of FIGURE 13. The signal from the detector circuit is fed into a voltage comparator which also receives a voltage reference signal obtained from an adjustable output reference voltage circuit. The reference voltage output of this latter circuit is adjusted to effectively cancel the signal from the detector circuit, assuming that the probe is positioned in operative proximity to a standard test specimen, and the comparator will thus provide a specific signal for a specific frequency to provide an operating point. Should the signal from the detector circuit vary from this standard condition, the comparator circuit will provide an appropriate signal to drive a voltage-actuated frequency-control device. The voltage-actuated frequency-control device responds to the signal and accordingly adjusts the frequency of operation of the oscillator. The oscillator is adjusted automatically until the output signal of the detector circuit is again balanced by the output reference voltage and the comparator output signal will be that magnitude necessary to maintain this balance condition. Connected in circuit with the voltage-frequency control is an output coupler which provides an analog frequency output that may be utilized by an automatic control system as previously suggested.

The test apparatus and method of operation as provided by this invention provide relatively greater accuracy and capability of testing materials by nondestructive techniques than prior-art apparatus of the pickup-coil type. The magnetic-reaction device test probe utilizing a magnetic-field-sensing semiconductor device permits measurement at low frequency with improved response to the test material properties, as well as static and dynamic testing. The sensitivity of the semiconductor device is independent of the frequency of operation and is instantaneously responsive to the magnitude of the magnetic fields. The apparatus provides separate measurement of the resultant magnetic field $H_n$ and the magnetic-reaction field $H_r$ in relation to the magnetization field $H_o$, for phase analysis of the $H_n$ and $H_r$ fields, and thus permits determination of the exact locus of operation on the complex H-plane. Also, the apparatus provides accurate frequency determination at each locus of operation. The parameters $H_o$, $H_n$, $H_r$ and F (frequency) completely describe the operating conditions of the sample material and can be readily correlated to specific properties using basic theoretical and empirical relations.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention what is claimed is:

1. A magnetic-reaction test apparatus for nondestructive testing comprising inductor means energized to produce a time-varying magnetic field of pulse or periodic waveform positioned in predetermined relationship to a material to be tested having specific parameters and disposed to electromagnetically couple said magnetic field with the material and effect an eddy-current reaction magnetic field related to parameters of the material, and magnetic-field-responsive means for sensing said eddy-current reaction field consisting of at least one semiconductor device positioned within said fields to provide a signal related to said eddy-current reaction field.

2. A magnetic-reaction test apparatus for nondestructive testing comprising inductor means positioned in predetermined relationship to test material having characteristic parameters, said inductor means being energized by a current supply means which provides a time varying magnetizing current of constant predetermined waveform to produce a magnetic field which is electromagnetically coupled with the test material to effect an eddy-current reaction magnetic field related to said parameters, means responsive to said magnetic field and said eddy-current reaction field consisting of a magnetic-field-sensing semiconductor device positioned relative to said inductor means to be responsive to said magnetic field and said eddy-current reaction field and provide an output signal related thereto, an input voltage reference network connected to said current supply means to provide a signal proportionally related to the magnetizing current of said inductor means, and output means providing an output signal related to said eddy-current reaction field and including a summing network having a first input connected to said semiconductor device to receive the output signal thereof and a second input connected to said input voltage reference network to receive said signal proportionally related to the magnetizing current, said summing network operative to effectively cancel that part of the semiconductor device output signal resulting from sensing of said magnetic field.

3. A magnetic-reaction test apparatus according to claim 2 wherein said current supply means is set to provide a magnetizing current of predetermined frequency and said output means provides an analog output signal having a voltage amplitude which is related to the parameters.

4. A magnetic-reaction test apparatus according to claim 2 wherein said current supply means is selectively operable to provide a magnetizing current at a selected frequency and includes means for adjusting the frequency and the apparatus includes an output reference voltage source operable to provide a voltage of preselected magnitude, a voltage comparator circuit having a first input connected to said output means and a second input connected to said output reference voltage source and being operable to provide an output related to the difference between the output signal of said output means and the voltage of said output reference voltage source, and means interconnected between said comparator output and said current supply frequency adjusting means operable to cause adjustment of the frequency to result in elimination of a difference between the output signal and the reference voltage for a specific test material.

5. A method for nondestructive testing of material consisting of inducing a time-varying magnetic field of pulses or periodic waveform in electromagnetically coupled relationship to the test material to effect an eddy-current reaction magnetic field related to the test material, detecting the magnetic field induced and the eddy-current-reaction field by a magnetic-field-sensing semiconductor device and providing an electrical signal related thereto, and eliminating by other electrical means that portion of said electrical signal resulting from detection of the induced magnetic field thereby yielding an output signal which is related to only the eddy-current-reaction field.

6. A magnetic-reaction test apparatus according to claim 2 wherein said semiconductor device comprises at least one Hall element.

7. A magnetic-reaction test apparatus according to claim 2 wherein said magnetic-field-responsive means consists of at least one other semiconductor device positioned within said field, each said device comprising a Hall element disposed in relatively spaced relationship to the other Hall element.

8. A magnetic-reaction test apparatus according to claim 7 wherein said two Hall elements have signal outputs which are inversely connected to provide a differential output signal.

9. A magnetic-reaction test apparatus according to claim 2 wherein said inductor means includes at least one current conducting path and said semiconductor means is positioned in electromagnetically coupled relationship with the magnetic field produced by said inductor means.

10. A magnetic-reaction test apparatus according to claim 2 wherein said inductor means includes an inductor coil and a ferromagnetic core.

11. A magnetic-reaction test apparatus according to claim 2 wherein said inductor means includes two current conducting paths connected to have contra-circulating magnetizing currents, said current paths being relatively disposed to confine the magnetizing field electromagnetically coupled with the material to a predetermined space within the material thereby resulting in a specific eddy current configuration.

12. A method for nondestructive testing of material having a magnetic permeability greater than unity consisting of first generating, at a selected frequency, a time-varying magnetic field of pulse or periodic waveform remote to the test material and thereby providing a reference magnetic field independent of the test material, detecting the reference magnetic field by magnetic-field-sensing semiconductor means to provide a first output signal, subsequently generating, at said selected frequency, a time-varying magnetic field of the same waveform in electromagnetically coupled relationship to the test material to effect an eddy-current reaction magnetic field related to the parameters of the test material, and detecting the induced magnetic field and the eddy-current reaction field related to the test material by magnetic-field-sensing semiconductor means to provide a second output signal for correlation with said first output signal to provide information as to the parameters.

13. A method for nondestructive testing according to claim 12 in which said time-varying magnetic field induces a flow of eddy currents in the test material and which includes the step of adjusting the frequency of the induced magnetic field to a specific frequency in producing said first and second output signals to provide a first output signal which is proportionally related to the second output signal in a predetermined ratio.

14. A method for detection of discontinuities relative to a test specimen consisting of generating a time-varying magnetic field of pulse or periodic waveform in electromagnetically coupled relationship to the test specimen and thereby inducing a flow of eddy currents in the test specimen which are of a configuration to normally flow through a space in which at least a portion of the discontinuity exists, said eddy currents normally producing an eddy-current reaction magnetic field in opposition to the induced magnetic field with the discontinuity distorting the normal eddy current configuration to effect a reversal in phase of at least a portion of the eddy-current reaction field in the immediate vicinity of the discontinuity, and detecting the induced magnetic field and the eddy-current reaction field by magnetic-field-sensing semiconductor means which is responsive to only a portion of the magnetic field whereby the localized, phase reversed eddy-current reaction magnetic field resulting at the discontinuity effects a reinforcement in an output signal produced by said semiconductor means when said semiconductor means is disposed in close proximity to the discontinuity providing an indication of relative location and magnitude of the discontinuity.

15. A magnetic-reaction test apparatus for nondestructive testing comprising inductor means positioned in predetermined relationship to test material having specific parameters, said inductor means including a first current-conducting path forming a closed loop and a second current-conducting path forming a closed loop with said second current-conducting path supported in predetermined relationship within the space defined by the central area of said first current-conducting path, said first and second current-conducting paths being series connected to provide oppositely directed magnetic fields with said second current-conducting path producing a magnetic field effective to cancel the magnetic field of said first path within the space defined by the closed loop of said second path with said inductor means operative to produce a time-varying magnetic field of predetermined waveform which is electromagnetically coupled with the test material to effect an eddy-current-reaction magnetic field related to said parameters, and means responsive to said eddy-current-reaction field consisting of a magnetic-field-sensing semiconductor device positioned relative to said inductor means to be responsive to only said eddy-current-reaction field and provide a signal related thereto.

16. A magnetic-reaction test apparatus for nondestructive testing of the thickness of non-conductive and non-magnetic test material comprising an electrically-conductive body contacting one surface of the test material, inductor means supported in proximate relationship to said electrically-conductive body with the test material interposed therebetween and energized to produce a time-varying magnetic field of predetermined waveform which is electro-magnetically coupled with said electrically-conductive body to effect an eddy-current-reaction magnetic field, and means responsive to said eddy-current-reaction field consisting of a magnetic-field-sensing semiconductor device responsive to said eddy-current-reaction field to provide a signal, said semiconductor device supported in fixed proximate relationship to the other surface of the test material and in coupled relationship to said eddy-current-reaction field with the coupled relationship determined by the thickness of the test material resulting in a signal which is related to the thickness.

17. A magnetic-reaction test apparatus according to claim 1 wherein the material to be tested has specific parameters including a permeability greater than unity, whereby a hysteresis reaction magnetic field related to the parameters of the material will result from said time varying magnetic field in addition to said eddy current reaction magnetic field and said magnetic-field-responsive semiconductor device senses both reaction fields to provide a signal related to the material parameters.

References Cited

UNITED STATES PATENTS

| | | | |
|---|---|---|---|
| 1,998,952 | 4/1935 | Edgar et al. | 324—45 |
| 2,033,654 | 3/1936 | Selquist et al. | 324—34 |
| 2,162,710 | 6/1939 | Gunn | 324—37 |
| 2,267,884 | 12/1941 | Zuschlag | 324—40 |
| 2,295,382 | 9/1942 | Brace | 324—37 |
| 2,337,148 | 12/1943 | Barnes | 324—37 |
| 2,629,004 | 2/1953 | Greenough | 324—34 |
| 2,933,677 | 4/1960 | Lieber | 324—34 |
| 2,939,073 | 5/1960 | Eul | 324—40 |
| 2,942,177 | 6/1960 | Neumann et al. | 324—45 |
| 3,281,667 | 10/1966 | Dobbins et al. | 324—40 |

FOREIGN PATENTS

| | | |
|---|---|---|
| 475,369 | 11/1937 | Great Britain. |
| 822,210 | 10/1959 | Great Britain. |
| 936,015 | 9/1963 | Great Britain. |

OTHER REFERENCES

McMasters, Robert: Nondestructive Testing Handbook New York, the Ronald Press Co., 1963, vol. II, pp. 34.17–34.18.

Vigness, I: Eddy Current Type Flaw Detectors for Non-Magnetic Metals, Journal of Applied Physics, vol. 13, June 1942, pp. 377–383.

RUDOLPH V. ROLINEC, *Primary Examiner.*

WALTER L. CARLSON, R. B. WILKINSON, *Examiners.*

R. J. CORCORAN, *Assistant Examiner.*

UNITED STATES PATENT OFFICE

CERTIFICATE OF CORRECTION

Patent No. 3,359,495 December 19, 1967

Robert C. McMaster et al.

It is hereby certified that error appears in the above numbered patent requiring correction and that the said Letters Patent should read as corrected below.

Column 8, line 67, for "unit" read -- unity --; column 15, line 12, after "waveform" insert -- and --; column 16, lines 8, 11, 21, 26 and 29, for the claim reference numeral "2" each occurrence, read -- 1 --.

Signed and sealed this 14th day of January 1969.

(SEAL)
Attest:

Edward M. Fletcher, Jr.
Attesting Officer

EDWARD J. BRENNER
Commissioner of Patents